United States Patent Office 2,693,497
Patented Nov. 2, 1954

2,693,497

SYNTHESIS OF UNSATURATED HYDROCARBONS FROM UNSATURATED KETONES

Seaver A. Ballard, Orinda, Harry De V. Finch, El Cerrito, and Elbert A. Peterson, Berkeley, Calif., assignors to Shell Development Company, San Francisco, Calif., a corporation of Delaware No Drawing. Application October 14, 1949, Serial No. 121,448

11 Claims. (Cl. 260—681)

This invention relates to a process for the synthesis of unsaturated hydrocarbons. More particularly, the present invention relates to a process for the direct synthesis of unsaturated hydrocarbons, particularly diene hydrocarbons, which involves reaction of an unsaturated ketone with an alcohol in the vapor phase in the presence of a catalyst. The application is a continuation-in-part of our allowed copending application, Serial No. 700,368, filed October 1, 1946, now U. S. Patent No. 2,492,956, issued January 3, 1950, which application is in turn a continuation-in-part of our application Serial No. 669,110, filed May 11, 1946, now abandoned, application Serial No. 669,110 being in turn a continuation-in-part of our pending application, Serial No. 633,860, filed December 8, 1945, now abandoned. The invention to which the present application is directed concerns a process for the direct synthesis of unsaturated hydrocarbons that is characterized in part by the particular catalysts that are used for effecting the synthesis, the catalysts of this invention being especially advantageous for the reasons, among others, that they are efficient, easy to prepare, highly economic, and serve for the direct synthesis of the desired unsaturated hydrocarbons in a desirably high state of purity.

It is known that certain unsaturated hydrocarbons, especially butadiene, can be prepared by reacting suitable olefinic aldehydes, particularly crotonaldehyde, with non-tertiary alcohols in the vapor phase in the presence of particular catalysts. Low yields, not over 25%, of butadiene have been described as resulting from the reaction under suitable conditions of crotonaldehyde and ethanol in the presence of precipitated aluminum hydroxide. More recently, there have been reported results of experiments designed to improve the synthesis of butadiene from crotonaldehyde by the use of certain other catalysts, such as pure silica gel and zirconium oxide, tantalum oxide, columbium oxide and combinations of these oxides with silica.

The processes known prior to our invention have been generally less satisfactory for the production of unsaturated hydrocarbons by reaction in the vapor phase between unsaturated ketones and alcohols. In our experiments, we have found that the reaction of mesityl oxide, a representative unsaturated ketone which is useful in the process of the present invention, with isopropyl alcohol over pure silica gel, a catalyst that is representative of those employed in the prior art, leads to undesirably low yields of methyl pentadienes. Unlike the unsaturated aldehydes that have been employed for the preparation of unsaturated hydrocarbons in the prior art, the unsaturated ketones, particularly the aliphatic and cycloaliphatic unsaturated ketones containing at least six carbon atoms, appear to be especially prone to undergo reactions other than the reaction or reactions leading to the desired unsaturated hydrocarbon. As a result, there is encountered excessive formation of products other than the desired unsaturated hydrocarbon, or else there is reaction (of any kind) to such a slight degree that only negligible formation of desired product is obtained.

In our allowed copending application, Serial No. 700,368, acknowledged above, there is disclosed and claimed a process for the preparation of unsaturated hydrocarbons, especially dienes, from alpha,beta-olefinic ketones containing at least six carbon atoms which is characterized in part by the use of catalysts comprising adsorptive aluminas comprising alumina alpha monohydrate, gamma alumina, or mixtures thereof, and a cobalt and/or a copper oxide. The invention to which the present application relates concerns a process for the preparation of unsaturated hydrocarbons, especially dienes, from unsaturated ketones, particularly alpha,beta-olefinic ketones containing at least six carbon atoms, presumably involving the same general reaction or reactions, but characterized in part by the use of another group of particular catalysts or types of catalyst.

The catalysts that are employed in accordance with the process of the present invention are solid catalysts comprising at least one oxide of an element of group II of the periodic table of the elements. It has been found that solid catalyst masses comprising at least one oxide of a group II metal are highly effective for the conversion of unsaturated ketones to unsaturated hydrocarbons by reaction with alcohols according to the process disclosed, and that with the aid of such catalysts good conversions to and yields of the desired product can be obtained. As catalysts for the desired reaction, catalysts comprising oxides of elements of group II of the periodic table of the elements have the advantage that they are easily prepared from materials that in many cases are available at negligible cost. The catalysts of the present invention have the further advantage that they promote minimal conversion of the unsaturated ketone or alcohol reactants to low-boiling or gaseous by-products. In other words, the catalysts which characterize the process of the present invention lead to little, if any, decomposition of the organic materials which are present to materials of substantially lower molecular weight. Another and particular advantage of the catalysts which are employed according to the present invention is the prolonged period of time over which they may be continuously employed without need for replacement or regeneration. As a result, desirably high conversions of the unsaturated ketone reactant per unit amount of catalyst are obtainable in accordance with the process of the invention.

The process of the present invention may be applied generally to the conversion to unsaturated hydrocarbons, of ketones that contain at least six carbon atoms and an unsaturated linkage of aliphatic character between two carbon atoms one of which is directly linked to the carbon atom of the carbonyl group. Although the unsaturated linkage may be either olefinic in character or acetylenic in character, particularly desirable results are obtained when the alpha,beta-unsaturated linkage is olefinic in character. By reference to an unsaturated linkage of aliphatic character, we intend to include not only an olefinic linkage between two aliphatic carbon atoms, but, as well, an olefinic linkage between two carbon atoms which are in a cycloaliphatic ring, since it is well-known that the latter type of linkage has many of the characteristics of a strictly aliphatic unsaturated linkage.

The unsaturated ketones which may be employed in accordance with the invention contain a linear group (which, however, may be a part of a ring) of at least four contiguous carbon atoms joined together by aliphatic carbon-to-carbon bonds and including the carbon atom of the carbonyl group. Such unsaturated ketones may be symmetrical or unsymmetrical and they may be acyclic or cyclic. They may contain one or more aromatic groups. Particularly advantageous results are obtained when the ketone is a non-aromatic ketone. Representative mono-olefinic ketones are, for example, mesityl oxide, homomesityl oxide, isopropyl isopropenyl ketone, butyl isopropenyl ketone, isobutyl isopropenyl ketone, ethyl isopropenyl ketone, and their various homologs and analogs. Suitable cyclic ketones include, among others, 3,5,5 - trimethyl - 2 - cyclohexen-1-one (isophorone), 2-cyclohexen-1-one, 2-methylcyclopenten-1-one, 3-ethyl-2-cyclohexen-1-one, 2,3-dimethyl-2-cyclohexen-1-one, 2-isopropylidene-1-cyclohexanone, 2-isobutylidene-3-methyl-1-cyclohexanone, 1-acetal-1-cyclohexene, 1-acetal-2-methyl-1-cyclohexene, and their various analogs and homologs. Ketones, such as allyl vinyl ketone, diisopropenyl ketone, 4-isopropenyl-2-cyclohexen-1-one, 3-isopropenyl-4-ethyl-2-cyclohexen-1-one, which will be seen to contain a plurality of olefinic linkages, may be employed to prepare unsaturated hydrocarbons containing more than two olefinic linkages. The unsaturated ketones which may be utilized in the process of the invention may contain a plurality of carbonyl groups, as in diketones and ketoaldehydes. They may also contain substituents provided such substituents are not of a kind and/or in a position in the molecule to interfere with the successful practice of the process of the invention. The process of this invention is especially suited to the preparation of unsaturated hydrocarbons of the herein-defined class from ketones that contain an olefinic linkage as the only carbon-to-carbon unsaturation, and that preferably contain from six to twelve carbon atoms. Because of the especially valuable nature of the unsaturated hydrocarbons (methylpentadienes) synthesized therefrom, mesityl oxide is an unsaturated ketone of particular interest. Other particularly useful hydrocarbons may be prepared according to the process from isophorone and homomesityl oxide.

In accordance with the process of the invention, a ketone of the herein-defined class is reacted with a non-tertiary, preferably saturated alcohol in the presence of a solid catalyst comprising an oxide of a metal of group II of the periodic table of the elements to directly produce an unsaturated hydrocarbon containing the same number of carbon atoms as the ketonic reactant. Suitable non-tertiary alcohols are alcohols that contain at least one hydroxyl group and that have at least one atom of hydrogen directly linked to the carbon atom to which the hydroxyl group is bonded. The lower non-tertiary alkanols, e. g., methanol, ethanol, propanol, isopropanol, butanol, isobutanol, and their suitable homologs are highly satisfactory and have the added, obvious advantage of low cost. More generally speaking, the alcohol may be any suitable non-tertiary alcohol, and may be saturated or unsaturated, cyclic or acyclic. Other alcohols which may be employed in accordance with the more generic aspects of the invention include, among others, allyl alcohol, methyl vinyl carbinol, benzyl alcohol, benzyl carbinol, cyclohexanol, trimethylene glycol, and the like and their various homologs and analogs. Among the various alcohols, isopropanol is particularly preferred, especially when mesityl oxide is the unsaturated ketonic reactant. The isopropanol is converted in the execution of the process to acetone. The acetone may be recovered and in turn may be converted by known methods to an additional amount of mesityl oxide.

The catalysts which are employed in accordance with and which characterize the process of the present invention contain as an essential component at least one oxide of a metal of group II of the periodic table of the elements. One or a plurality of such oxides may be used in the substantially pure state. Even higher conversions of the unsaturated ketone reactant to desired unsaturated hydrocarbon product have been observed when, in addition to the oxide(s) of group II metals the catalyst comprises an additional substance having hydrogenation-dehydrogenation activity. This type of catalyst is employed in accordance with the more highly preferred aspects of the invention.

As examples of oxides of elements of group II of the periodic table of the elements, which may be employed alone or in admixture as the catalyst in accordance with the invention, there are the oxides of the metals of the main group of group II of the periodic tables, these oxides including beryllium oxide, magnesium oxide, calcium oxide, strontium oxide and barium oxide. Zinc oxide and cadmium oxide, which are heavy metals of group II, are also included. The oxides of the metals of group II having atomic numbers less than 80 are particularly contemplated. Mixtures of oxides of metals of group II which may be employed as catalysts in the execution of the process of the invention include binary, ternary, as well as even quaternary or higher mixtures, examples of suitable mixtures being oxides of calcium and magnesium, of magnesium and zinc, of calcium and zinc, of beryllium and zinc, of calcium, magnesium, and zinc, of strontium and calcium, of beryllium, strontium and zinc, and of zinc and barium. Particularly preferred catalysts containing a plurality of oxides of metals of group II are those which contain as one of the oxides the oxide of zinc, preferably in a predominating amount (mole basis) based upon the other oxide or oxides of group II element(s) present, preferably in conjunction with an oxide of an alkaline earth metal, such as calcium or magnesium, catalysts containing zinc oxide having been found to result in higher yields of the desired unsaturated hydrocarbons than the catalysts of the present invention that do not contain zinc oxide.

When, as is preferred, the oxide or oxides of the metal(s) of group II of the periodic table of the elements is or are employed in conjunction with a material that is an active hydrogenation-dehydrogenation catalyst, such material may be, for example, copper, iron, magnetite, iron oxide, alumina, chromium oxide, thoria, copper chromite, and like substances of the class generally known as and referred to by those skilled in the art as hydrogenation-dehydrogenation catalysts. When such a mixture of two or more substances comprises the catalyst, the substances generally may be present in any suitable proportion. A particularly valuable catalyst is one containing zinc oxide, or zinc oxide and a lesser amount of an alkaline earth metal oxide, supported upon an activated alumina, the oxides of zinc and the alkaline earth metal preferably being present in a mole ratio within the range of from about 1:1 to about 20:1. Catalysts comprising a minor amount, preferably from about 2% to about 45% by weight, of an oxide of a metal of group II of the periodic table of the elements or a mixture of oxides of metals of group II of the periodic table of the elements, and a major proportion of an activated alumina, are especially suited to the objects of the invention.

The activated aluminas which are employed in accordance with one embodiment of the invention are adsorptive aluminas, which comprise predominantly alumina alpha monohydrate, gamma alumina, or mixtures of alumina alpha monohydrate and gamma alumina, which adsorptive alumina may or may not contain minor proportions of another oxide of an amphoteric element, e. g., ferric oxide. The aluminas that are characterized by their active adsorptive characteristics are obtainable from various natural sources or they may be prepared by known synthetic methods. An efficient and inexpensive activated or adsorptive alumina can be prepared by treatment, or calcination of selected natural bauxite ores. Activated or calcined bauxites, as well as adsorptive aluminas having the same general physical and chemical characteristics as activated or calcined bauxites, are particularly suitable for use in accordance with the process of the invention. Synthetic adsorptive aluminas can be prepared according to known methods from gels, which may be peptized or unpeptized, or preferably from the crystalline form, such as the crystalline alpha alumina trihydrate crystallized from alkali aluminate solutions. Various methods for preparing activated or adsorptive aluminas are well-known and will be apparent to those skilled in the art.

The catalyst which is employed in accordance with the present invention may be in the form of a powder, in the form of pellets or other shaped pieces, in the form of fragments or other particles of regular or irregular contour. The catalyst mass may be self-supporting or it may be supported in or upon an inert or active support, such as pumice, silica, charcoal, kieselguhr, silicon carbide porous aggregates, and the like. In some cases the finely-ground metal oxide or oxides that are to constitute the catalyst mass conveniently may be worked up with water to a paste, the paste extruded in the form of cylinders of suitable size, and the cylinders dried. Suitable catalysts may be formed by pilling or other operations known to those skilled in the art relating to the preparation or forming of catalyst masses.

According to a preferred mode of executing the process of the invention, a mixture comprising the unsaturated ketone and the non-tertiary alcohol is contacted in the vaporous state with the solid catalyst comprising the oxide or oxides of one or more metals of group II of the periodic table of the elements. Although considerable latitude is permissible, the temperature employed generally is from about 200° C to about 500° C., a preferred range being from about 200° C. to about 350° C., and a particularly effective range, when the catalyst comprises zinc oxide, being between about 250° C. and 340° C. Catalysts comprising zinc oxide and an activated alumina generally can be employed at lower temperatures than, for example, magnesia or magnesia-alumina catalysts with substantially equivalent results. When the catalyst is or essentially comprises magnesium oxide, temperatures higher than those most suitable for the zinc oxide catalysts are preferred, e. g., about 375° C. to 475° C. The non-tertiary alcohol preferably is employed in excess, on a mole basis compared to the unsaturated ketone, mole ratios of (non-tertiary alcohol):(unsaturated ketone) of from 1:1 to 10:1 being generally suitable and such ratios of from 2:1 to 6:1 being preferred. Inert diluent gases, although the presence thereof is ordinarily neither required nor preferred, may be included in the gaseous mixture which is contacted with the catalyst. It is desirable to conduct the process under substantially anhydrous conditions. The presence of molecular hydrogen is not required for accomplishing the objects of the invention. The use of substantially atmospheric pressures is generally most convenient; however, the process may be conducted under subatmospheric or superatmospheric pressures.

When, as is preferred, the process is carried out in a continuous manner, any type of apparatus suitable for use in catalytic vapor phase reactions of the present type may be employed. When the catalyst is employed as a fixed bed, as is preferred, the bed of the catalyst may be positioned in a suitable chamber, such as a heated elongated tube, and a gaseous mixture of the selected reactants passed therethrough under suitable conditions of temperature, pressure, proportions of the reactants, and rate of flow. The rate of flow to be used with most advantage in any particular case is determined to a certain extent by the particular reactants that are involved, by the nature of the catalyst, the temperature, and the related reaction conditions. In each case, the several reaction conditions may be correlated to obtain optimum conversion of the unsaturated ketone to the desired unsaturated hydrocarbon. In general, the rate of flow, which expressed numerically as equal to the total number of moles of the reactants contacted with 100 cc. of the catalyst per minute, may be within the range of from about 0.005 to about 0.10 mole of reactants per 100 cc. of catalyst per minute. More preferably, rates of flow from about 0.02 to about 0.075 total mole of reactants per 100 cc. of catalyst are used. In particular cases, rates of flow from about 0.04 to about 0.06 are optimum, especially when the catalyst is one that comprises zinc oxide or zinc oxide and an activated or adsorbent alumina, and the temperature is between about 250° C and about 340° C., or magnesium oxide and the temperature is between about 375° C. and 475° C.

The process conveniently is conducted by vaporizing the respective reactants, the vapors being preheated, if desired, to the reaction temperature, and passing a gaseous mixture of the vapors through or over a bed of the solid catalyst comprising an oxide of a metal of group II of the periodic table of the elements. While the catalyst is preferably used in the form of a fixed bed, "fluidized" beds of finely divided catalyst may be used. It is an advantage of the present catalysts that they can be employed for prolonged periods of time without need for regeneration. If carbonaceous, tarry, or like deposits should accumulate on the catalyst after extensive use, such deposits may be removed by interrupting the process at any convenient time and passing air or other suitable molecular oxygen-containing gas through the catalyst bed to burn off undesired organic deposits. Inert gas, such as steam, nitrogen and carbon dioxide, may be present during the regeneration treatment. During the regeneration treatment, the temperature of the catalyst mass is maintained at temperatures preferably between about 350° C. and 950° C., although in certain cases, when for example, a magnesia-zinc oxide catalyst is employed, peak temperatures of about 480° C. during the reactivation are preferable. In any case, temperatures higher than about 900° C. ordinarily are avoided since they may tend to cause undesired changes in the characteristics of the catalyst and permanently affect its activity.

The products that are obtained from the reaction of the alpha,beta-unsaturated ketones of the herein-defined class with non-tertiary alcohols in the presence of the catalysts of the invention comprise predominantly one or more unsaturated hydrocarbons that contain the same number of carbon atoms per molecule as the unsaturated ketone reactant but that contain more carbon-to-carbon unsaturation than said reactant. When an unsaturated monoketone containing an alpha,beta-olefinic linkage as the only carbon-to-carbon unsaturation is employed, the product comprises one or more diene hydrocarbons that contain the same number of carbon atoms as the unsaturated ketone reactant. Mixtures of such hydrocarbons may be formed, wherein the component unsaturated hydrocarbons differ by the position(s) of the olefinic linkage(s). The formation of such mixtures appears to be due to a possible isomerization under the conditions of reaction which results in a shift in the position of at least one of the unsaturated linkages of the unsaturated hydrocarbon product. It will be understood that the unqualified terms "a methylpentadiene," "a diene," or "an unsaturated hydrocarbon," although used in the singular, are intended to include the plural and that the plural forms thereof are intended to include the singular.

The desired unsaturated hydrocarbon product may be recovered from the reaction products in any convenient suitable manner. In continuous operation of the process, the gaseous effluent from the reaction chamber contains the desired unsaturated hydrocarbon product along with any unreacted unsaturated ketone, non-tertiary alcohol and possible by-products. The unsaturated hydrocarbon or hydrocarbons produced in the process can be separated from the effluent in any suitable way, such as by fractional distillation of the condensed effluent, by treatment with selective solvents, by chemical means, or the like. Mixtures of isomeric hydrocarbons, if produced, can be resolved, for example, by known chemical or physical methods, it being understood, however, that the process of the present invention is not regarded as being limited according to whether or not such subsequent separation of mixtures of isomeric hydrocarbons is undertaken. Any unreacted unsaturated ketone and/or non-tertiary alcohol present in the effluent from the reaction zone may be recovered and recycled through the process.

The following examples will illustrate certain of the specific embodiments of the invention. It will be appreciated that the examples are presented with the intent of illustrating the invention and not as a limitation upon the invention, which is defined in the hereto appended claims.

*Example I*

For this experiment, which illustrates use of a zinc oxide-activated alumina catalyst, the catalyst was prepared by impregnating 200 grams of granular activated alumina with an aqueous solution containing 73 grams of zinc nitrate hexahydrate. The impregnated activated alumina was dried and the zinc nitrate was decomposed to zinc oxide by heating in air at about 400° C. The catalyst contained about 10% by weight of zinc oxide.

About 100 cc. of the zinc oxide-activated alumina were packed into a steel tube having an inside diameter of about ⅝ inch and a heated length of about 24 inches. A thermocouple well, ¼ inch outside diameter, extended coaxially through the reactor tube to provide means for measurement of the temperature.

The catalyst and tube were heated to and maintained at about 250° C. by means of heating elements surrounding the reaction tube. Isopropyl alcohol and mesityl oxide were vaporized, the vapors mixed, and a stream of the mixture passed through the tube in a mole ratio of 9.5:1 and at a rate of flow equal to 0.049 total moles of reactants per 100 cc. of the catalyst per minute. The pressure was substantially atmospheric. The gaseous effluent from the reactor was condensed in a water-cooled condenser and the condensate fractionally distilled. Methylpentadienes, in a purity of about 96%, were recovered in a conversion of applied mesityl oxide to product of 62.5%, as the fraction distilling between about 74° C. and 76° C.

*Example II*

For this experiment, the catalyst was prepared by finely grinding in a ball mill a slurry of magnesium oxide, filtering the slurry, extruding the resulting stiff moist paste in the form of short cylinders about ⅛ inch in diameter, and drying at 125° C. to 150° C. About 100 cc. of the catalyst was used in the apparatus described in Example I.

Isopropyl alcohol and mesityl oxide were passed in the vapor phase at a mole ratio of 6:1 and a rate of flow equal to 0.049 total mole of reactants per 100 cc. of the catalyst per minute, over the catalyst heated to a temperature of about 460° C. The effluent was treated as in Example I for recovery of product. Fifty-two per cent of the mesityl oxide feed was converted to methylpentadienes.

*Example III*

Mesityl oxide and isopropyl alcohol were mixed in the vapor state in a mole ratio of 6:1 and passed at a rate of flow equal to 0.074 total mole per 100 cc. of catalyst per minute, over a fresh portion of the catalyst used in the preceding example. The reaction temperature was about 460° C. Methylpentadienes were recovered from the effluent from the reaction tube in an amount corresponding to a 44.3% conversion of mesityl oxide to product.

*Example IV*

In order to compare a catalyst containing zinc oxide with the magnesium oxide catalyst used in the preceding example, a catalyst containing 10% by weight of zinc oxide and 1% by weight of calcium oxide on activated alumina was prepared by impregnating granular activated alumina with an aqueous solution of zinc and calcium nitrates, drying and decomposing the nitrates to the oxides.

Isopropyl alcohol and mesityl oxide were vaporized separately and a mixture of the vapors in a mole ratio of 6:1 passed over the catalyst at a rate of flow equal to 0.073 total mole per minute, of catalyst per minute, at a catalyst temperature of 370° C. Of the mesityl oxide feed, 60% was recovered as methylpentadienes. It will be seen that with the exception of the temperature and the composition of the catalyst, this experiment and the one described in the next preceding example were substantially the same. The results of this experiment indicate that the catalyst containing zinc oxide is active at lower temperatures than the magnesia catalyst.

*Example V*

The catalyst was prepared by extruding as in Example I a wet paste of a finely-ground mixture of 89 parts by weight calcium oxide and 11 parts by weight of magnesium oxide, and drying the extrudate. At a temperature of 430° C., passing a gaseous mixture of isopropyl alcohol and mesityl oxide, mole ratio 6:1, over the catalyst at a rate of flow equal to 0.049 mole of reactants per 100 cc. of catalyst per minute resulted in a 34% conversion of mesityl oxide to methylpentadienes.

*Example VI*

Isopropyl alcohol and mesityl oxide were vaporized and passed at a mole ratio of 6:1 and a rate of flow equal to 0.024 total mole of reactants per 100 cc. of catalyst per minute, over a further portion of the catalyst used in Example I, while maintaining the temperature at 250° C. Of the mesityl oxide fed, 53.2% was converted to methylpentadienes.

Although in the examples the invention has been illustrated with particular reference to the preparation of methylpentadienes from mesityl oxide and isopropyl alcohol, it is to be understood that the invention is not limited according to this particular unsaturated ketone of the class described hereinbefore, nor to the use of the specific non-tertiary alcohol. Other non-tertiary alcohols, e. g., ethanol, butanol, isobutanol, and propanol, can be substituted for the isopropanol. By employing isophorone instead of mesityl oxide, trimethylcyclohexadienes can be prepared. From methyl isopropenyl ketone, isoprene can be prepared. Homomesityl oxide (5-methyl-4-hepten-3-one) can be employed for the preparation of octadienes and methyl hexadienes can be prepared from 2-methyl-2-hexen-4-one. The catalysts by which the process of the invention is, in part, characterized, may be employed according to the process of the invention to prepare numerous useful unsaturated hydrocarbons by reacting alpha,beta-unsaturated ketones of the defined class and nontertiary alcohols.

We claim as our invention:

1. In a process for the preparation of a methylpentadiene by interaction of mesityl oxide and an alcohol, passing a gaseous mixture comprising mesityl oxide and isopropyl alcohol into contact with a solid catalyst essentially comprising zinc oxide and an adsorptive alumina comprising predominantly a member of the group consisting of alumina alpha monohydrate, gamma alumina, and mixtures thereof, and recovering a methylpentadiene from the reaction products.

2. In a process for the preparation of a methylpentadiene by interaction of mesityl oxide and an alcohol, passing a gaseous mixture comprising mesityl oxide and isopropyl alcohol into contact with a solid catalyst essentially comprising zinc oxide at a temperature of from about 200° C. to about 500° C. and recovering a methylpentadiene from the reaction products.

3. In a process for the preparation of a methylpentadiene by interaction of mesityl oxide and a lower alkanol having at least one atom of hydrogen directly linked to the carbon atom to which the hydroxyl group is bonded the improvement consisting of effecting such interaction by passing a gaseous mixture comprising said reactants into contact with a solid catalyst essentially comprising zinc oxide, the mole ratio of mesityl oxide to lower alkanol in said gaseous mixture being within the range of from about 1:1 to about 10:1, at a temperature within the range of from about 200° C. to about 350° C. and at a rate of flow of from about 0.005 to about 0.10 total mole of reactants per 100 cubic centimeters of catalyst per minute.

4. In a process for the preparation of a methylpentadiene by interaction of mesityl oxide and an alcohol having at least one atom of hydrogen directly linked to the carbon atom to which the hydroxyl group is bonded the improvement consisting of effecting such interaction by passing a gaseous mixture comprising said reactants into contact with a solid catalyst essentially comprising an oxide of an element of group II of the periodic table of the elements at a temperature within the range of from about 200° C. to about 500° C. and at a rate of flow of from about 0.005 to about 0.10 total mole of reactants per 100 cubic centimeters of catalyst per minute.

5. In a process for the preparation of a methylpentadiene by interaction of mesityl oxide and an alcohol having at least one atom of hydrogen directly linked to the carbon atom to which the hydroxyl group is bonded the improvement consisting of effecting such interaction by passing a gaseous mixture comprising said reactants into contact with a solid catalyst essentially comprising an oxide of an element of group II of the periodic table of the elements at a temperature of from about 200° C. to about 350° C., and recovering a methylpentadiene from the reaction products.

6. In a process for the preparation of a diene by interaction of an alpha,beta-olefinically unsaturated ketone containing at least six carbon atoms and having a linear group of at least four contiguous carbon atoms joined together by aliphatic carbon-to-carbon bonds including the carbon atom of the carbonyl group and a secondary alcohol the improvement consisting of effecting such reaction by passing a gaseous mixture comprising said reactants into contact with a solid catalyst essentially comprising zinc oxide at a temperature of from about 200° C. to about 350° C., and recovering a diene containing the same number of carbon atoms as the alpha,beta-olefinically unsaturated ketone from the reaction products.

7. In a process for the preparation of a diene by interaction of an alpha,beta-olefinically unsaturated ketone containing at least six carbon atoms and having a linear group of at least four contiguous carbon atoms joined together by aliphatic carbon-to-carbon bonds including the carbon atom of the carbonyl group and an alcohol the improvement consisting of effecting such reaction by passing a gaseous mixture comprising said reactants having at least one atom of hydrogen directly linked to the carbon atom to which the hydroxyl group is bonded into contact with a solid catalyst essentially comprising an oxide of an element of group II of the periodic table of the elements at a temperature of from about 200° C. to about 500° C. and at a rate of flow equal to about 0.02 to about 0.075 total mole of reactants per 100 cubic centimeters of catalyst per minute, and recovering a diene containing the same number of carbon atoms as the alpha,beta-olefinically unsaturated ketone from the reaction products.

8. In a process for the preparation of a diene by interaction of an alpha,beta-olefinically unsaturated ketone containing at least six carbon atoms and having a linear group of at least four contiguous carbon atoms joined together by aliphatic carbon-to-carbon bonds including the carbon atom of the carbonyl group and a secondary alcohol the improvement consisting of effecting such reaction by passing a gaseous mixture comprising said reactants into contact with a solid catalyst essentially comprising magnesium oxide at a temperature of from about 200° C. to about 500° C. and a rate of flow of from about 0.02 to about 0.075 total mole of reactants per 100 cubic centimeters of catalyst per minute, and recovering a diene containing the same number of carbon atoms as the alpha,beta-olefinically unsaturated ketone from the reaction products.

9. In a process for the production of a diene by interaction of an alpha,beta-olefinically unsaturated ketone having a linear group of at least four contiguous carbon atoms joined together by aliphatic carbon-to-carbon bonds including the carbon atom of the carbonyl group and a secondary alcohol the improvement consisting of effecting such reaction by passing a gaseous mixture comprising said reactants into contact with a solid catalyst essentially comprising zinc oxide at a temperature of from about 200° C. to about 500° C. and at a rate of flow of from about 0.005 to about 0.10 total mole of reactants per 100 cubic centimeters of catalyst per minute.

10. In a process for the production of a diene by interaction of an alpha,beta-olefinically unsaturated ketone having a linear group of at least four contiguous carbon atoms joined together by aliphatic carbon-to-carbon bonds including the carbon atom of the carbonyl group and an alcohol having at least one atom of hydrogen directly linked to the carbon atom to which the hydroxyl group is bonded the improvement consisting of effecting such reaction by passing a gaseous mixture comprising said reactants into contact with a solid catalyst essentially comprising an oxide of an element of group II of the periodic table of the elements at a temperature of from about 200° C. to about 350° C., the mole ratio of said alpha,beta-olefinically unsaturated ketone to said alcohol in the gaseous mixture being within the range of from about 1:1 to about 10:1, at a rate of flow of from about 0.005 to about 0.10 total mole of reactants per 100 cubic centimeters of catalyst per minute.

11. In a process for the production of a diene by interaction of an alpha,beta-olefinically unsaturated ketone having a linear group of at least four contiguous carbon atoms joined together by aliphatic carbon-to-carbon bonds including the carbon atom of the carbonyl group and an alcohol having at least one atom of hydrogen directly linked to the carbon atom to which the hydroxyl group is bonded the improvement consisting of effecting such reaction by passing a gaseous mixture comprising said reactants into contact with a solid catalyst essentially comprising an oxide of an element of group II of the periodic table of the elements at a temperature of from about 200° C. to about 500° C.

References Cited in the file of this patent

UNITED STATES PATENTS

| Number | Name | Date |
|---|---|---|
| 2,410,445 | Ipatieff et al. | Nov. 5, 1946 |
| 2,421,361 | Toussaint et al. | May 27, 1947 |
| 2,423,681 | Butterbaugh et al. | July 8, 1947 |
| 2,502,431 | Copenhaver et al. | Apr. 4, 1950 |
| 2,502,432 | Copenhaver et al. | Apr. 4, 1950 |

FOREIGN PATENTS

| Number | Country | Date |
|---|---|---|
| 28,459 | Holland | Nov. 16, 1932 |